Feb. 26, 1946. J. J. PETROVICH 2,395,426
COMBINED COUPLING FOR RAILWAY VEHICLES AND THE LIKE
Filed Jan. 19, 1945
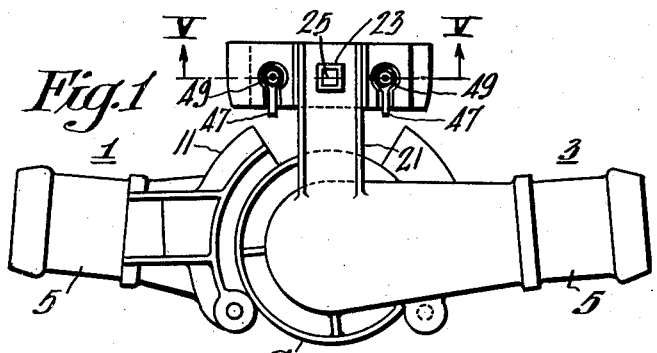
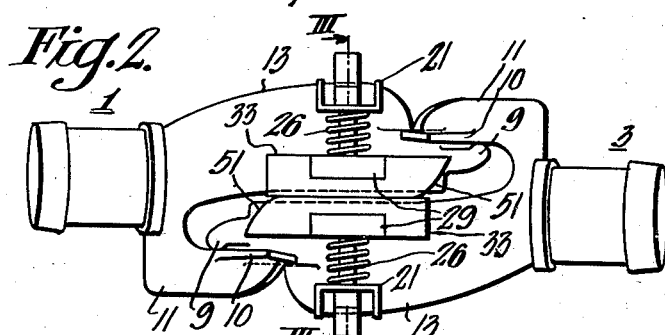
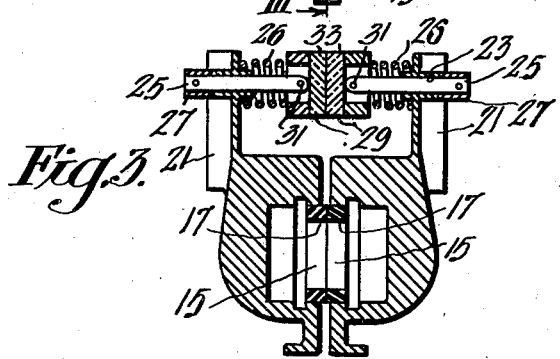
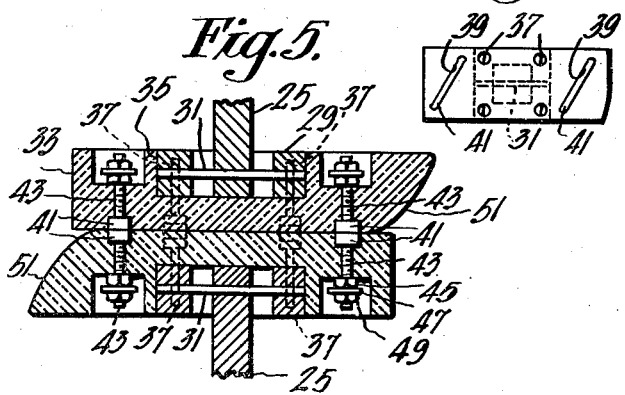
INVENTOR.
Joseph J. Petrovich
BY
Henry Huff
AGENT Patented Feb. 26, 1946

2,395,426

UNITED STATES PATENT OFFICE 2,395,426

COMBINED COUPLING FOR RAILWAY VEHICLES AND THE LIKE

Joseph J. Petrovich, Trenton, N. J.

Application January 19, 1945, Serial No. 573,495

11 Claims. (Cl. 173—332)

This invention relates to improvements in communication couplings for use between the cars of a railway train or the like, and more particularly to combined pneumatic and electrical coupling devices, wherein the operation of coupling the air hoses of adjacent cars will also connect one or more electrical circuits, such as a telephone line, between the cars.

The principal object of the invention is to provide an improved coupling device of the type described which includes hose-coupling means of substantially conventional design such has been used in the past for connecting air lines of railway vehicles, and an electrical connector formed integrally therewith in such manner as to be engaged and disengaged with the hose coupling.

Another object is to provide a combined coupling of the class described in which the electrical connector is entirely outside the air conducting portion of the device, although mechanically integral therewith.

A further object of the invention is to provide a coupling of the class described which is readily engageable or disengageable by a single operation.

Still another object is to provide a coupling of the described type in which the connections are unaffected by vibration or rough handling such as are likely to occur in the normal operation of railway vehicles.

These and other objects will become apparent to those skilled in the art upon consideration of the following description, with reference to the accompanying drawing of which Figure 1 is a front elevation of a coupling embodying the present invention, Figure 2 is a plan view of the structure of Figure 1, Figure 3 is a section along the line III—III of Figure 2, Figure 4 is a view of the face of one of the contact blocks of the device of Figure 1, and Figure 5 is a section along the line V—V of Figure 1.

Referring to Figures 1 and 2, the illustrated embodiment of the invention includes a hose coupling device of more or less standard design comprising two identical members 1 and 3, each provided with a generally tubular portion 5 adapted to be secured to a flexible hose by means of clamps, and a disc-like body 7 provided with a segmental flange 9 and an arcuate flange-engaging portion 11. The tubular portions 5 terminate in curved portions 13 provided with openings 15 (see Figure 3) which abut each other when the members 1 and 3 are in engaged position. Sealing rings 17 of rubber or similar material are provided in the openings 15.

The structure thus far described operates as follows:

To engage the coupling, the members 1 and 3 are brought together with the openings 15 in alignment with each other, with the tubular portions 5 both extending generally downward as viewed from the position of Figure 1. The member 1 is then rotated clockwise, or the member 3 is rotated counter-clockwise, or both, causing the flanges 9 to be engaged by the respectively opposite flange engaging members 11. The flanges are provided with ribs 10 which are tapered slightly, so that the members 1 and 3 are forced together along the axis of the openings 15, compressing the rings 17 to provide air tight connection.

The electrical coupling structures are also identical on the members 1 and 3. Each includes a lug 21 formed integrally with the body 13 of the hose coupling, and extending outward therefrom radially with respect to the axis of the opening 15. The outer end of the lug 15 is provided with a substantially square opening 23 through which a square rod 25 passes with a sliding fit. The outer end of the rod 25 is provided with a collar or headed portion 27 to limit the motion of the rod inward of the coupling.

The inner end of the rod 25 is surrounded by a substantially square metal block 29 provided with a square opening, somewhat larger in cross section than the rod 25, into which the rod extends. The block 29 is secured pivotally to the rod 25 by a hinge pin 31, shown best in Figure 5. The pin 31 extends horizontally in the views of Figure 1 and Figure 4, so that the block 29 is free to rock about an axis approximately parallel to the tubular portions 5, perpendicular to the rod 25 and to the axis of the opening 15. A coiled compression spring 26 surrounds the rod 25, in engagement with the lug 21 and the block 29, to urge the block 29 inwardly of the coupling.

A block 33 of insulating material is provided with a slot 35 into which the block 29 fits. The block 33 is secured to the block 29 by means of screws 37. The screws 37 are countersunk in the block 33 so that their heads lie below the engaging surface of the block. Oblong slots 39 are formed in the surface of the block 33, at an angle to the direction of the pin 31 (see Figure 4). Each of the slots 39 holds a similarly shaped contact member 41. The contacts 41 are provided with threaded tails 43 extending through holes in the block 33 and secured thereto by nuts 45. Electrical connection is made to the contacts through soldering lugs 47, which are secured to the contact tails 43 by nuts 49. The block 33 is rounded or bevelled at its leading edge 51 to provide a cam action upon engagement of the coupling.

In the operation of the device, engagment of the blocks 33 is effected by engagement of the hose coupling, described above. The leading edges 51 of the blocks 33 slide over each other, compressing the springs 26. As the blocks slide into place, the respectively engaging contacts slide over each other diagonally, affording a self-cleaning action. The springs 26 maintain the contacts under a relatively heavy constant pressure against each other, ensuring continuity of the connection under adverse vibration conditions. The pivotal support afforded by the hinge pins 31 enables the blocks to lie flat against each other independently of slight misalignment or relative motion of the coupling members 1 and 3.

It will be apparent without further illustration that more than two contacts may be provided on each of the blocks 33, if required, or that the lugs 21 may be made longer to accommodate two or more block assemblies. Although the invention has been described as including a specific air-hose coupling, it is to be understood that other hose couplings may be employed, subject only to the requirement that they engage or disengage by rotation of the two elements with respect to one another through a fractional turn.

I claim as my invention:

1. A combined pneumatic and electrical coupling for railway vehicles and the like, including a hose coupling of known type comprising two mating members adapted to be engaged and disengaged by rotation with respect to each other, a pair of lugs, each formed on one of said members in such position that said lugs are placed in juxtaposition to each other by engagement of said members, a pair of rods, each supported at the outer end of one of said lugs for reciprocating motion toward the other of said rods, and each provided with a spring urging it toward the other, a pair of blocks of insulating material, each supported at the end of one of said rods, and a plurality of electrical contacts disposed upon each of said blocks.

2. A combined pneumatic and electrical coupling for railway vehicles and the like, including a hose coupling of known type comprising two mating members adapted to be engaged and disengaged by rotation with respect to each other through an angle of less than one-half turn, a pair of lugs, each formed on one of said members in such position that said lugs are placed in juxtaposition to each other by engagement of said members, a pair of rods, each supported at the outer end of one of said lugs for reciprocating motion toward the other of said rods, and each provided with a spring urging it toward the other, a pair of blocks of insulating material, each supported at the end of one of said rods, and a plurality of electrical contacts disposed upon each of said blocks.

3. A combined pneumatic and electrical coupling for railway vehicles and the like, including a hose coupling of known type comprising two mating members adapted to be engaged and disengaged by rotation with respect to each other through an angle of less than one-half turn, a pair of lugs, each formed on one of said members in such position that said lugs are placed in juxtaposition to each other by engagement of said members, a pair or rods, each supported at the outer end of one of said lugs for reciprocating motion toward the other of said rods, and each provided with a spring urging it toward the other, a pair of blocks of insulating material, each pivotably supported at the end of one of said rods, and a plurality of electrical contacts disposed upon each of said blocks.

4. A combined pneumatic and electrical coupling for railway vehicles and the like, including a hose coupling of known type comprising two mating members adapted to be engaged and disengaged by rotation with respect to each other through an angle of less than one-half turn, a pair of lugs, each formed on one of said members in such position that said lugs are placed in juxtaposition to each other by engagement of said members, a pair of rods, each supported at the outer end of one of said lugs for reciprocating motion toward the other of said rods, and each provided with a spring urging it toward the other, a pair of blocks of insulating material, each pivotably supported at the end of one of said rods for rotation about an axis parallel to the direction of motion of said blocks with respect to each other during engagement or disengagement of said coupling, and a plurality of electrical contacts disposed upon each of said blocks.

5. A combined pneumatic and electrical coupling for railway vehicles and the like, including a hose coupling of known type comprising two mating members adapted to be engaged and disengaged by rotation with respect to each other through an angle of less than one-half turn, a pair of lugs, each formed on one of said members in such position that said lugs are placed in juxtaposition to each other by engagement of said members, a pair of rods, each supported at the outer end of one of said lugs for reciprocating motion toward the other of said rods, and each provided with a spring urging it toward the other, a pair of blocks of insulating material, each pivotably supported at the end of one of said rods for rotation about an axis parallel to the direction of motion of said blocks with respect to each other during engagement and disengagement of said coupling, and a plurality of electrical contacts disposed upon each of said blocks, said contacts being of generally rectangular form and inclined at an acute angle to said pivotal axes of said blocks.

6. A combined pneumatic and electrical coupling for railway vehicles and the like, including a hose coupling of known type comprising two mating members adapted to be engaged and disengaged by rotation with respect to each other through an angle of less than one-half turn, a pair of lugs, each formed on one of said members in such position that said lugs are placed in juxtaposition to each other by engagement of said members, a pair of rods, each supported at the outer end of one of said lugs for reciprocating motion toward the other of said rods, and each provided with a spring urging it toward the other, a pair of blocks of insulating material, each pivotably supported at the end of one of said rods for rotation about an axis parallel to the direction of motion of said blocks with respect to each other during engagement or disengagement of said coupling, and at least one electrical contact disposed upon each of said blocks, said contacts being of generally rectangular form and inclined at an acute angle to said pivotal axes of said blocks.

7. The invention as set forth in claim 6, wherein each of said blocks is of generally rectangular form, with the initially-engaging portions provided with cam surfaces.

8. A combined pneumatic and electrical coupling for railway vehicles and the like, including two identical hose-coupling members provided with mating segmental flanges for engagement and disengagement by rotation of said members with respect to each other through approximately one-quarter turn, a radially extending lug formed on each of said members so that said lugs are positioned parallel to each other upon engagement of said members, a rod supported reciprocally at the outer end of each of said lugs and at right angles thereto in such manner that said rods lie in alignment with each other upon engagement of said members, a block of insulating material supported swivelably at the end of each of said rods, a compression spring surrounding each of said rods and in contact with the respective block and the respective lug in such relationship as to urge said blocks into contact with each other upon engagement of said coupling members, and at least one electrical contact supported upon each of said blocks.

9. A combined pneumatic and electrical coupling for railway vehicles and the like, including two identical hose-coupling members provided with mating segmental flanges for engagement and disengagement by rotation of said members with respect to each other through approximately one-quarter turn, a radially extending lug formed on each of said members so that said lugs are positioned parallel to each other upon engagement of said members, a rod supported reciprocally at the outer end of each of said lugs and at right angles thereto in such manner that said rods lie in alignment with each other upon engagement of said members, a block of insulating material supported swivelably at the end of each of said rods, a compression spring surrounding each of said rods and in contact with the respective block and the respective lug in such relationship as to urge said blocks into contact with each other upon engagement of said coupling members, and a plurality of electrical contacts supported upon each of said blocks.

10. A combined pneumatic and electrical coupling for railway vehicles and the like, including two identical hose-coupling members provided with mating segmental flanges for engagement and disengagement by rotation of said members with respect to each other through approximately one-quarter turn, a radially extending lug formed on each of said members so that said lugs are positioned parallel to each other upon engagement of said members, a rod supported reciprocally at the outer end of each of said lugs and at right angles thereto in such manner that said rods lie in alignment with each other upon engagement of said members, a block of insulating material supported at the end of each of said rods, a compression spring surrounding each of said rods and in contact with the respective block and the respective lug in such relationship as to urge said blocks into contact with each other upon engagement of said coupling members, and a plurality of electrical contacts supported upon each of said blocks.

11. A combined pneumatic and electrical coupling for railway vehicles and the like, including two identical hose-coupling members provided with mating segmental flanges for engagement and disengagement by rotation of said members with respect to each other, a radially extending lug formed on each of said members so that said lugs are positioned parallel to each other upon engagement of said members, a rod supported reciprocally at the outer end of each of said lugs and at right angles thereto in such manner that said rods lie in alignment with each other upon engagement of said members, a block of insulating material supported at the end of each of said rods, a compression spring surrounding each of said rods and in contact with the respective block and the respective lug in such relationship as to urge said blocks into contact with each other upon engagement of said coupling members, and a plurality of electrical contacts supported upon each of said blocks.

JOSEPH J. PETROVICH.